United States Patent
Chen

(10) Patent No.: US 10,580,117 B2
(45) Date of Patent: Mar. 3, 2020

(54) METHOD TO GENERATE ADDITIONAL LEVEL OF DETAIL WHEN ZOOMING IN ON AN IMAGE

(71) Applicant: Comcast Cable Communications, LLC, Philadelphia, PA (US)

(72) Inventor: Michael Chen, Wallingford, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 15/818,158

(22) Filed: Nov. 20, 2017

(65) Prior Publication Data

US 2019/0156459 A1   May 23, 2019

(51) Int. Cl.
*G06T 3/40* (2006.01)
*G06T 11/00* (2006.01)
*G06T 19/00* (2011.01)

(52) U.S. Cl.
CPC .......... *G06T 3/4053* (2013.01); *G06T 11/001* (2013.01); *G06T 19/006* (2013.01)

(58) Field of Classification Search
None
See application file for complete search history.

(56) References Cited

U.S. PATENT DOCUMENTS

| | | | |
|---|---|---|---|
| 6,782,143 B1* | 8/2004 | Dube | G06T 3/403 324/309 |
| 9,111,378 B2* | 8/2015 | Chui | H04N 7/0125 |
| 9,117,285 B2* | 8/2015 | Clemie | G06T 9/00 |
| 9,729,899 B2* | 8/2017 | Tourapis | H04N 19/597 |
| 2004/0036687 A1* | 2/2004 | Nakamura | G06T 3/4007 345/422 |
| 2009/0129630 A1* | 5/2009 | Gloudemans | G06T 15/20 382/103 |
| 2011/0032251 A1* | 2/2011 | Pothana | G06T 9/00 345/419 |
| 2012/0086850 A1* | 4/2012 | Irani | G06T 3/4053 348/441 |
| 2015/0093015 A1* | 4/2015 | Liang | G06T 3/4076 382/154 |
| 2017/0200304 A1* | 7/2017 | Li | G02B 27/017 |
| 2017/0347125 A1* | 11/2017 | Tourapis | H04N 19/597 |
| 2017/0359586 A1* | 12/2017 | Xue | H04N 19/167 |
| 2018/0144535 A1* | 5/2018 | Ford | G06T 15/005 |
| 2018/0144547 A1* | 5/2018 | Shakib | G06T 19/003 |
| 2018/0286106 A1* | 10/2018 | Apodaca | G06T 3/40 |
| 2018/0350036 A1* | 12/2018 | VanReenen | G06T 15/04 |

* cited by examiner

Primary Examiner — Ryan M Gray
(74) Attorney, Agent, or Firm — Banner & Witcoff, Ltd.

(57) ABSTRACT

Methods and systems are described for generating additional levels of detail when zooming in on an image. A viewer may desire to zoom in on an image to see a portion of the image in greater detail. This portion of the image may be analyzed to determine if zoom enhancement is necessary. If it is determined that zoom enhancement is necessary, the zoomed region may be matched to a replacement texture. The replacement texture may be used to enhance the image by replacing some or all of the image data.

20 Claims, 10 Drawing Sheets

METHOD TO GENERATE ADDITIONAL LEVEL OF DETAIL WHEN ZOOMING IN ON AN IMAGE

BACKGROUND

Improving image quality has been a goal of electronic image reproduction since the dawn of black-and-white television to today's modern high definition flat-screen displays. Similarly, early computers presented crude images on small, monochrome displays and have evolved to being capable of displaying millions of pixels describing three-dimensional rendered scenes. Technologies such as Virtual Reality (VR), Augmented Reality (AR), and Mixed Reality (MR) continue to push the boundaries of realism in image reproduction. These technologies and others have also enabled more interactivity with reproduced images than ever before. The goal of these and related technologies is to reproduce images at sufficient quality to convey a realistic image. However, zooming in on an image may yield insufficient detail and provide a poor user experience. There remains an ever-present need to improve electronic still and moving picture reproduction quality to achieve this goal of reproducing realistic images.

SUMMARY

The following summary is for illustrative purposes only, and is not intended to limit or constrain the detailed description. The following summary merely presents various described aspects in a simplified form as a prelude to the more detailed description provided below.

A viewer may desire to zoom in on an image to see a portion of the image in greater detail. For example, zooming in on a two-dimensional raster image displayed on a television screen may involve selecting a portion of the image and enlarging it to fill the entire television screen. Some example types of images may include two-dimensional raster images, two-dimensional vector images, two-dimensional raster video sequences, two-dimensional vector video sequences, 360-degree video sequences, 360-degree raster images, augmented reality (AR) images or displays, three-dimensional rendered images, virtual reality (VR) images or displays, mixed reality (MR) images or displays, or the like, as well as any combination thereof.

Some aspects of the present disclosure disclose a method to generate additional levels of detail when zooming in on an image. First, and according to some implementations, a determination may be made regarding whether it is necessary to enhance a selected zoom region of a source image. The image quality of the zoom region may be assessed and compared against various standards and measurements to determine if zoom enhancement is necessary. Next, the image content of the zoom region may be characterized. Then, a texture database may be searched to find a substitute or replacement texture that substantially matches the image content of the zoom region. The texture database may contain raster textures which may be stored as raster graphics or images, for example. Raster graphics describe images by describing a plurality of pixels, individual points of image data, which represent an image or scene. An example of a raster graphic or image format which may be used to store raster textures is a bitmap image format. The texture database may also contain vector textures which may be stored as vector graphics or images. Vector graphics describe an image by mathematical models describing lines, colors, gradients, and other such parameters which comprise the image. An example of a vector image format which may be used to store vector graphics or images is the Scalable Vector Graphics (SVG) format. Any other suitable image format for raster or vector textures maybe used, including lossy or lossless image formats. Once a substitute or replacement texture that substantially matches the image content of the zoom region is identified, then the identified replacement texture or textures may then be combined with the source image data of the zoom region to produce an enhanced zoom region.

In other aspects of the present disclosure, a source image may be comprised of multiple segments. The source image may be segmented into multiple segments of continuous texture character prior to zoom enhancement. Then, each segment may be individually enhanced and rejoined to re-create the original image region at a higher level of zoom.

Some aspects of the present disclosure relate to source images that are three-dimensional rendered scenes. The zoom enhancement method may be applied to individual object textures in a three-dimensional rendered scene. In other aspects of the present disclosure, textures may be derived from the source image for use as replacement textures. Textures may also be algorithmically and/or dynamically generated rather than retrieved from a database.

The summary here is not an exhaustive listing of the novel features described herein, and is not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and is not limited by, the accompanying figures in which like numerals indicate similar elements.

DETAILED DESCRIPTION

In the following description of various illustrative examples, reference is made to the accompanying drawings, which form a part hereof, and in which is shown, by way of illustration, various examples in which aspects of the disclosure may be practiced. It is to be understood that other examples may be utilized and structural or functional modifications may be made, without departing from the scope of the present disclosure. In the following description of various illustrative examples, reference is made to the accompanying drawings, which form a part hereof, and in which is shown, by way of illustration, various examples in which aspects of the disclosure may be practiced. It is to be understood that other examples may be utilized and structural or functional modifications may be made, without departing from the scope of the present disclosure.

Figure 1:
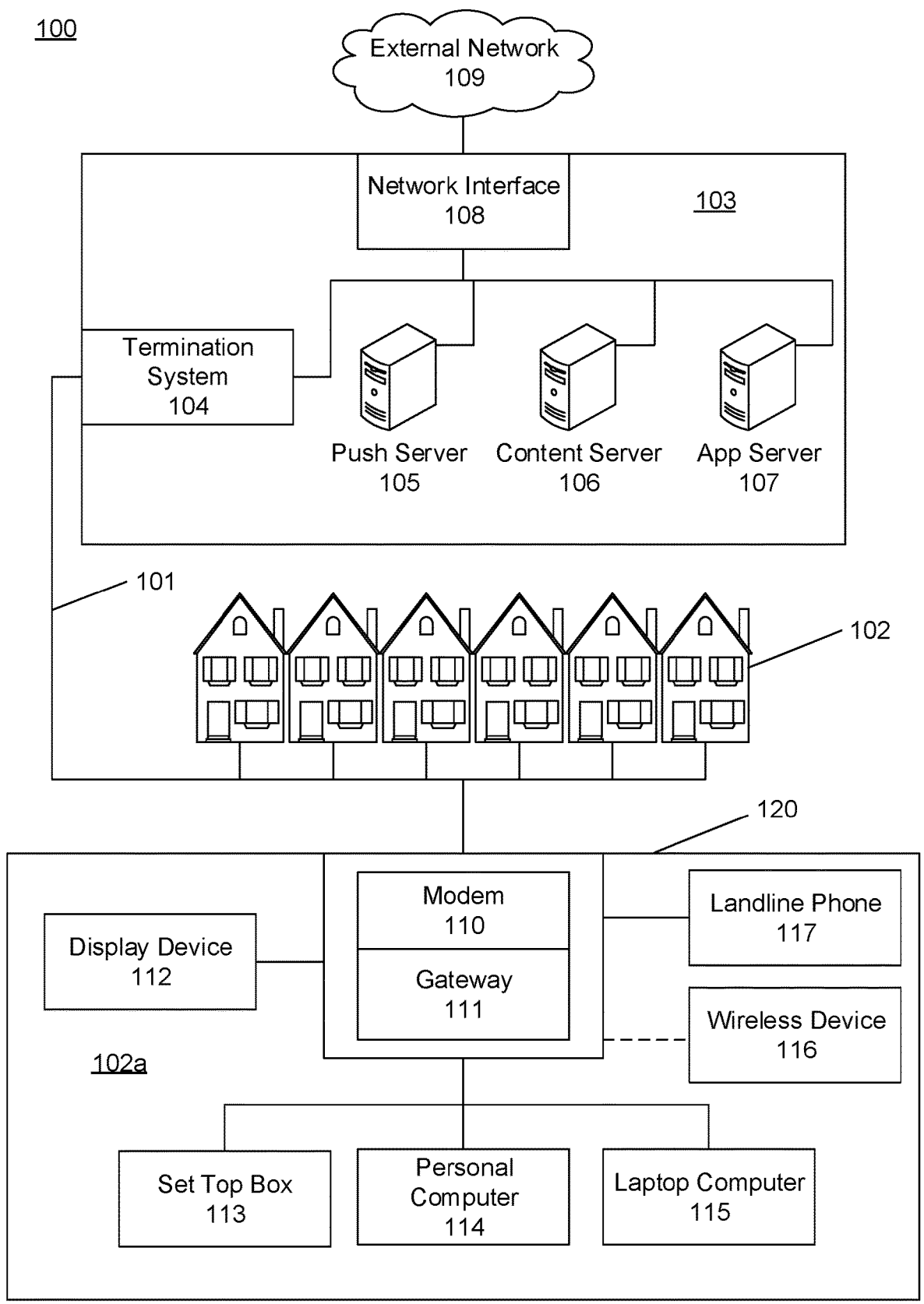
FIG. 1 shows an example communication network on which many of the various features described herein may be implemented.

FIG. 1 shows an example communication network 100 on which many of the various features described herein may be implemented. The network 100 may be any type of information distribution network, such as satellite, telephone, cellular, wireless, etc. The network 100 may be an optical fiber network, a coaxial cable network, or a hybrid fiber/coax distribution network. Such networks 100 use a series of interconnected communication links 101, such as coaxial cables, optical fibers, or wireless links to connect multiple premises 102, such as businesses, homes, or user dwellings to a local office 103 or headend. The local office 103 may transmit downstream information signals onto the links 101 and the premises 102 may have receivers used to receive and to process those signals.

There may be one link 101 originating from the local office 103, and it may be split a number of times to distribute the signal to various premises 102 in the vicinity, which may be many miles, of the local office 103. The links 101 may include components such as splitters, filters, amplifiers, etc., to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface 104, such as a termination system (TS). For example, the interface 104 may be a cable modem termination system (CMTS), which may be a computing device configured to manage communications between devices on the network of the links 101 and backend devices such as servers 105-07. The interface 104 may be as specified in a standard, such as the Data Over Cable Service Interface Specification (DOCSIS) standard, published by Cable Television Laboratories, Inc. (a.k.a. CableLabs), or it may be a similar or modified interface. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks, such as a WiMAX network, satellite networks, or any other desired network. These networks 109 may transmit content to the local office 103 via a plurality of variable size, fixed duration video fragments. The network interface 108 may include the corresponding circuitry needed to communicate on the external networks 109, and to other devices on the network such as a cellular telephone network and its corresponding cell phones.

As noted above, the local office 103 may include a variety of servers 105-07 that may be configured to perform various functions. The local office 103 may include a push notification server 105. The push notification server 105 may generate push notifications to deliver data or commands to the various premises 102 in the network or to the devices in the premises 102 that are configured to detect such notifications. The local office 103 may also include one or more content servers 106. The content servers 106 may be one or more computing devices that are configured to provide content to users at their premises. This content may be, for example, video content such as video on demand movies or television programs, songs, text listings, or other types of content. The content server 106 may include software to validate user identities and entitlements, to locate, retrieve and receive requested content, to encrypt the content, and to initiate delivery by streaming of the content to the requesting user or device. The content may comprise a plurality of fixed size, variable duration video fragments. The local office 103 may include a load balancer (not illustrated) to route service requests to one of the content servers 106. The load balancer might route the service requests based on utilization or availability of each of the content servers 106.

The local office 103 may also include one or more application servers 107. An application server 107 may be a computing device configured to offer any desired service, and may run various languages and operating systems, such as servlets and JSP pages running on Tomcat/MySQL, OSX, BSD, Ubuntu, Red Hat, HTML5, JavaScript, AJAX, or COMET. The application server 107 may be responsible for collecting television program listings information and generating a data download for electronic program guide listings. In some aspects of the disclosure, the application server 107 may be responsible for monitoring user viewing habits and collecting that information for use in selecting advertisements. The application server 107 may be responsible for formatting and inserting advertisements in a video stream being transmitted to the premises 102. Although shown separately, one of ordinary skill in the art will appreciate that the push server 105, the content server 106 and the application server 107, may be combined. Further, here the push server 105, content server 106, and the application server 107 are shown generally, and it will be understood that they may each contain memory storing computer executable instructions to cause a processor to perform steps described herein or memory for storing data.

An example premise 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem, for coaxial cable links 101, a fiber interface node, for fiber optic links 101, a twisted-pair telephone modem, a cellular telephone transceiver, a satellite transceiver, a local Wi-Fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem 110 to allow one or more other devices in the premises 102a, to communicate with the local office 103 and other devices beyond the local office 103. The gateway interface device 111 may be a set top box 113 (STB), digital video recorder (DVR), computer server, or any other desired computing device. The gateway interface device 111 may also include local network interfaces to provide communication signals to requesting entities or devices in the premises 102a, such as display devices 112, for example, televisions, additional STBs 113 or DVRs, personal computers 114, laptop computers 115, wireless devices 116 such as wireless routers, wireless laptops, notebooks, tablets, netbooks, or smart phones, cordless phones, for example, Digital Enhanced Cordless Telephone—DECT phones, mobile phones, mobile televisions, personal digital assistants (PDA), landline phones 117, which may be Voice over Internet Protocol (VoIP) phones, and any other desired devices. Examples of the local network interfaces include Multimedia Over Coax Alliance (MoCA) interfaces, Ethernet interfaces, universal serial bus (USB) interfaces, wireless interfaces such as IEEE 802.11 or IEEE 802.15, analog twisted pair interfaces, Bluetooth interfaces, and others.

The gateway interface device 111 or a display device 112 may be used to view video content delivered from the content server 106. Additionally, the gateway interface device 111 or a display device 112 may be used to schedule recordings of the video content or to display a program listing indicating start and end times for video content.

Figure 2:
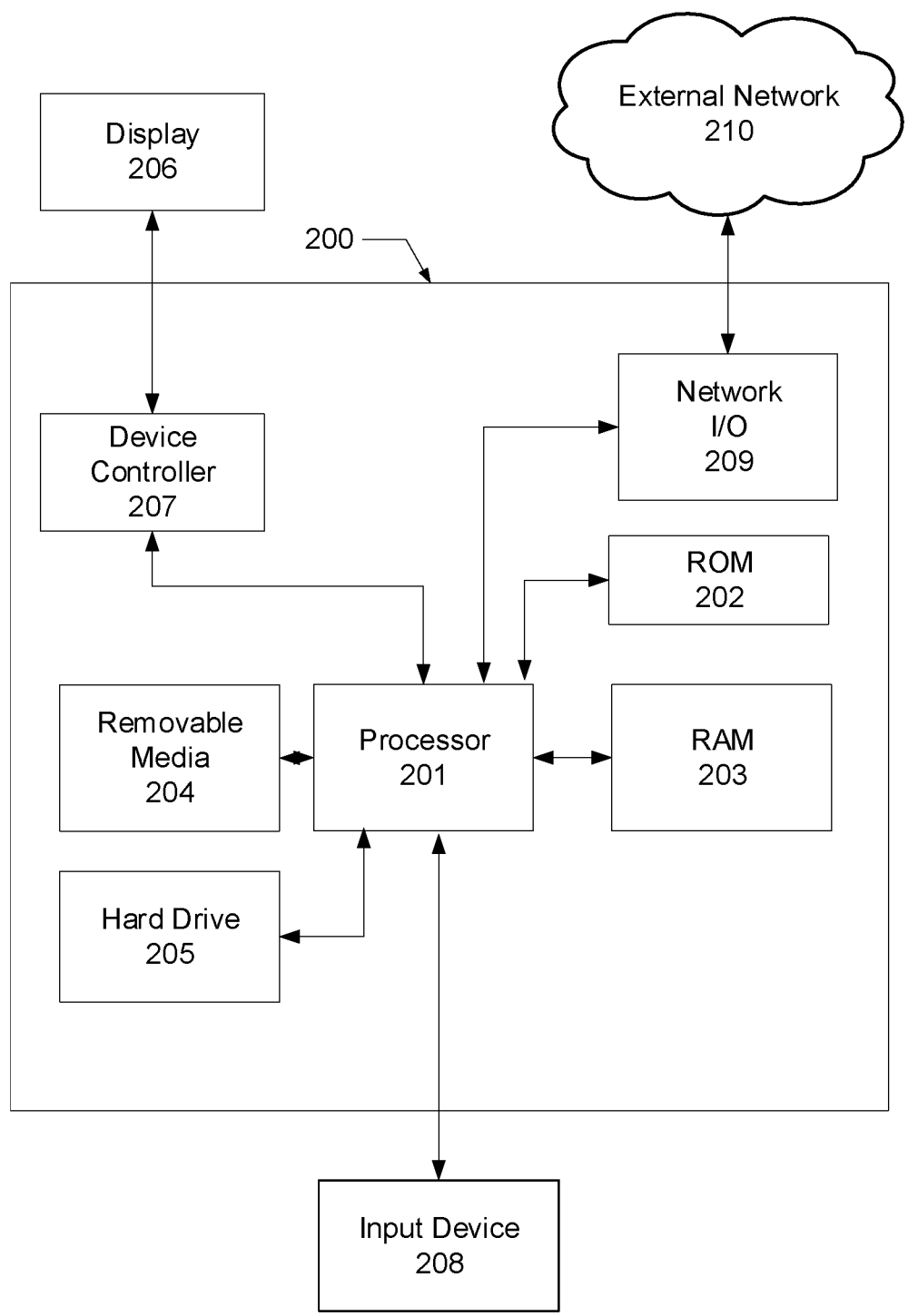
FIG. 2 shows an example computing device that may be used to implement any of the methods described herein.

FIG. 2 shows an example computing device that may be used to implement any of the methods described herein. A computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, a random access memory (RAM) 203, a removable media 204, such as a Universal Serial Bus (USB) drive, a compact disk (CD) or a digital versatile disk (DVD), a floppy disk drive, or any other desired storage medium. The storage medium may comprise a plurality of sectors, wherein a size of each sector of the plurality of sectors is approximately a multiple of a substantially fixed fragment size. Instructions may also be stored in an attached, or internal, hard drive 205. The computing device 200 may include one or more output devices, such as a display 206, for example, an external television, and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209, for example, a network card, to communicate with an external network 210. The network I/O circuit 209 may be a wired interface, a wireless interface, or a combination of the two. The network I/O circuit 209 may include a modem, such as a cable modem, and the external network 210 may include the communication links 101 discussed above, the external network 109, an in-home network, a provider's wireless, coaxial, fiber, or hybrid fiber/coaxial distribution system, such as a DOCSIS network, or any other desired network.

FIG. 2 shows a hardware configuration of the device 200, but it should be understood that some or all of the illustrated components may be implemented as software. Modifications may be made to add, to remove, to combine, or to divide components of the computing device 200 as desired. Additionally, the components illustrated may be implemented using basic computing devices and components, and the same components (e.g., a processor 201, a ROM storage 202, a display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform. For example, a requesting entity can be a separate software process and program from a dependent entity, both of which may be executed as software on a common computing device.

One or more aspects of the disclosure may be embodied in a computer-usable data or computer-executable instructions, such as in one or more program modules, executed by one or more computers or other devices. Generally, program modules include routines, programs, objects, components, data structures, etc. that perform particular tasks or implement particular abstract data types if executed by a processor in a computer or other data processing device. The computer executable instructions may be stored on one or more computer readable media such as a hard disk, an optical disk, a removable storage media, a solid state memory, a RAM, etc. The functionality of the program modules may be combined or distributed as desired. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

According to some aspects described herein, a viewer may desire to zoom in on an image to see a portion of the image in greater detail. Some example types of images may include two-dimensional raster images, two-dimensional vector images, two-dimensional raster video sequences, two-dimensional vector video sequences, a frame of a two-dimensional raster video sequence, a frame of a two-dimensional vector video sequence, two-dimensional raster moving images, two-dimensional vector moving images, 360-degree video sequences, 360-degree raster images, a frame of a 360-degree video sequence, augmented reality (AR) images or displays, three-dimensional rendered images, three-dimensional rendered scenes, virtual reality (VR) images or displays, mixed reality (MR) images or displays, or the like, as well as any combination thereof. In an example, an image may be displayed on display device 112 in a premise 102.

For example, zooming in on a two-dimensional raster image displayed on a television screen may involve selecting a portion of the image and enlarging it to fill the entire television screen. A zoom region may be indicated, in some examples, by indicating a locus of zoom and a zoom level. A zoom region may also be indicated, in some examples, by indicating the boundaries or at least some boundaries of a zoom region on a display. Touch-screen displays such as tablet computers may present intuitive interfaces for viewers to indicate a desire to zoom in on an image. With these interactive displays, a user may indicate a zoom region by a two-finger gesture such as a pinch gesture. In interactive display devices such as a VR headset, a viewer may move closer to an object in a virtual space displayed in the VR image to indicate a zoom region. As the viewer moves closer to the object, the object takes up more of the field of view of the VR headset. In these ways and more, images are becoming increasingly interactive with consumers and viewers desiring to interact with images during viewing.

Image storage and communication mechanisms such as those implemented in network 100 generally have limitations on transmission bandwidth, storage capacity, and/or processing capabilities that limit how much information can be used to describe an image. For example, a high definition television image may be encoded at a 1920×1080 resolution. Image parameters may be selected to produce an acceptable image quality for a certain display or output device while making trade-offs to conserve bandwidth, storage capacity, and/or processing power. For example, the high definition television image may be encoded at a specified resolution and bitrate that is supported by the display device, processing circuitry, and allotted broadcast bandwidth that produces the desired quality image for the intended display.

Because of these limitations and trade-offs in image storage and transmission, zooming in on an image region decreases the amount of data available to describe the field of view of a given display device. That is, zooming in on a portion of an image typically decreases the amount of the source image data that can be used to fill the same field of view. By disregarding a portion of the source image data, zooming in on an image may be detrimental to image quality if insufficient source image data is available to provide an acceptable quality image at that zoom level.

Figure 3A:
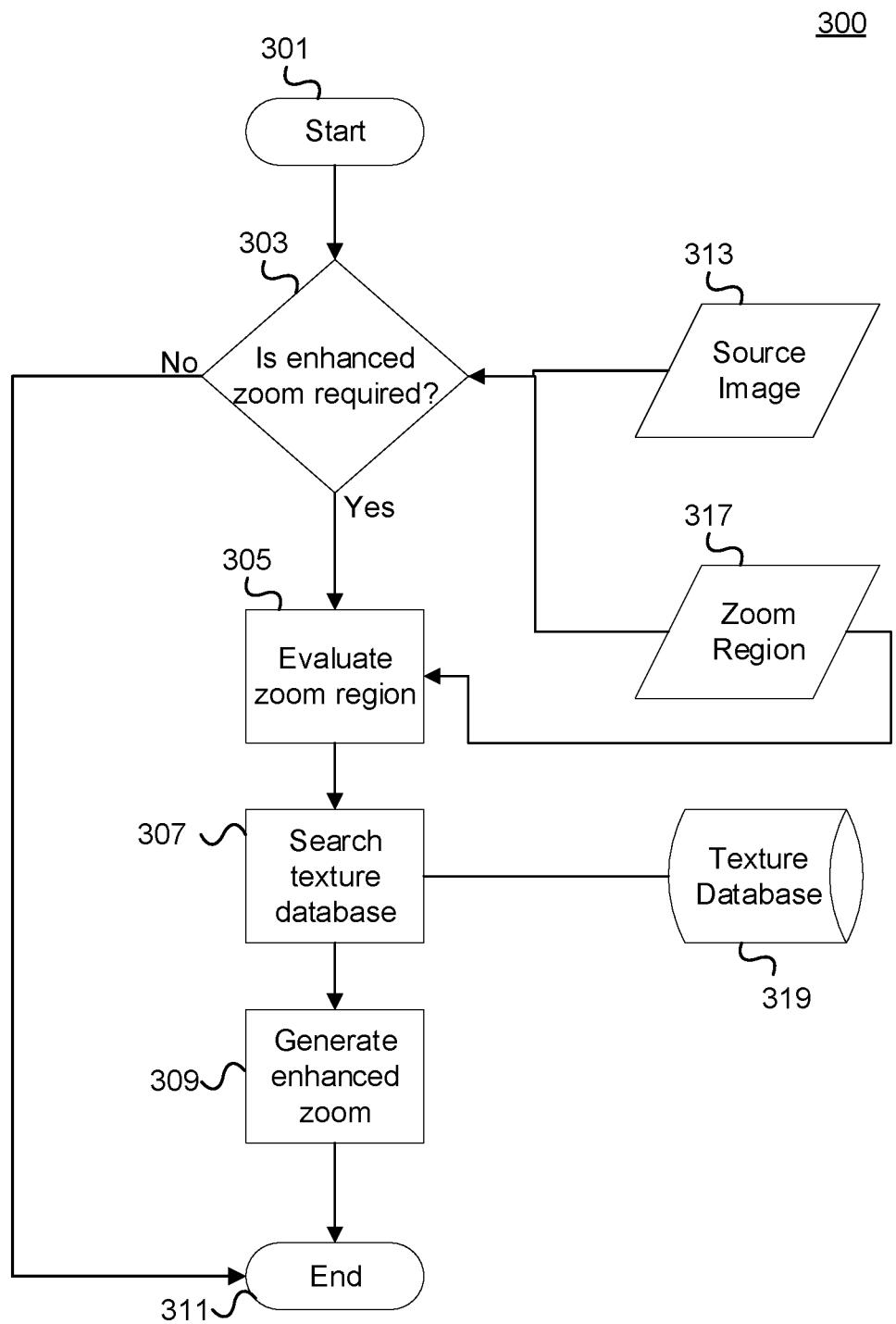
FIG. 3A is an example flow diagram of a method to generate additional level of detail when zooming in on an image.

FIG. 3A illustrates a method to generate additional levels of detail when zooming in on an image. The method to generate additional levels of details when zooming illustrated in FIGS. 3A and 3B may increase the perceived quality of zoomed images beyond what is available from the source image. A substitute image portion, in the form of a texture, may be retrieved from a database and used to enhance or even replace entirely the zoom region. The result is a hybrid or entirely synthetic image in that at least a portion of the resultant image is derived from the texture database and is not necessarily present in the source image.

Figure 3B:
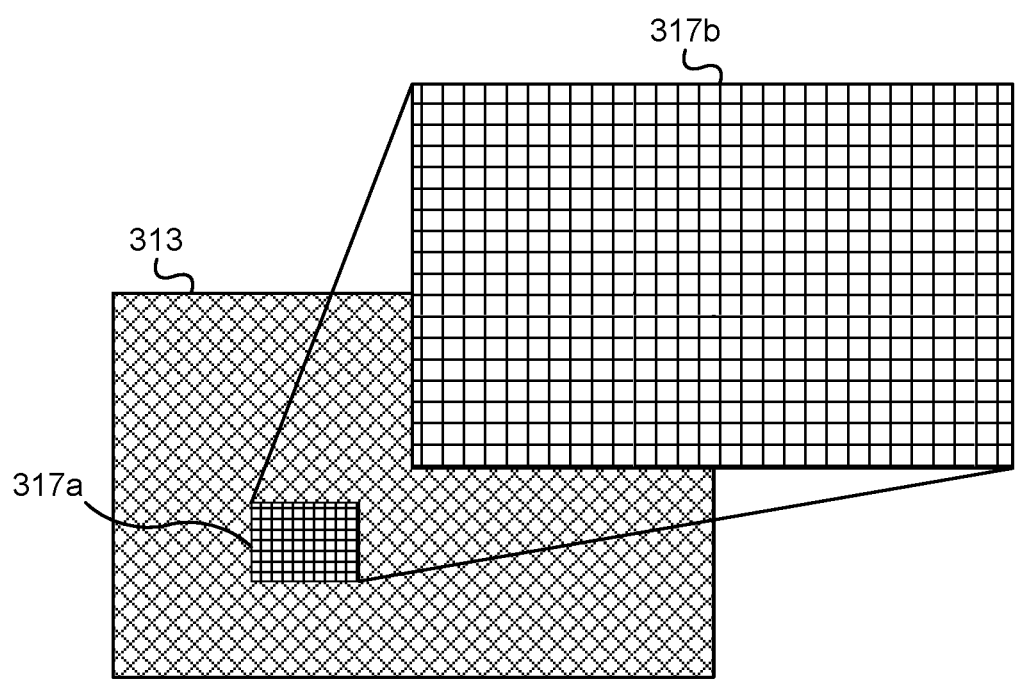
FIG. 3B illustrates the relationship between a source image and a zoom region.

The method of FIGS. 3A and 3B may be implemented at various points in network 100. For example, a method to generate additional levels of detail when zooming in on an image may be implemented on set top box 113 located in a premise 102 such as example premise 102a which is a home. Similarly, other devices within premise 102 may implement the method to generate additional levels of detail when zooming in on an image, such as but not limited to gateway interface device 111, display devices 112, STBs 113 or DVRs, personal computers 114, laptop computers 115, and wireless devices 116. In some embodiments, the method to generate additional levels of detail when zooming in on an image may be implemented on devices external to premises 102, such as in local office 103. For example, the method to generate additional levels of detail when zooming in on an image may be implemented using interface 104, content servers 106, and/or application servers 107. In some embodiments, various aspects or steps of the method to generate additional levels of detail when zooming in on an image may be implemented on multiple devices located remotely from one-another. For example, some aspects or steps may be implemented on devices located in local office 103 while other steps or aspects may be implemented on devices located in premise 102.

The inputs to the method illustrated in FIGS. 3A and 3B may include source image 313 and zoom region 317. The relationship between source image 313 and zoom region 317 is illustrated in FIG. 3B. As illustrated in FIG. 3B, the source image 313 may be an image at its original or 'native' resolution and size, filling the field of view of a display device. In the example illustrated in FIG. 3B, the source image 313 is a rectangular image such as a video image. In other examples, the source image 313 may be a three-dimensional scene rendered for AR or VR purposes or a 360-degree video signal, among other examples. The zoom region 317 may be the portion of the source image that a viewer has indicated a desire to enlarge to the same size as source image 313, as part of a zoom operation. For example, a user may zoom in on a two-dimensional video signal by locating a cursor on the display and pressing a "+" button on a remote to zoom into that portion of the source image 313. In another example, a user may use AR or VR control inputs to move in a virtual space closer to an object or a portion of an AR or VR scene to indicate a desire to zoom in on that portion of the source image. FIG. 3B illustrates the zoom level by comparison of zoom region 317a as a portion of source image 313 and enlarged zoom region 317b that has been enlarged to fill the field of view of the display device. Both zoom regions 317a and 317b describe the same portion of source image 313, but zoom region 317b has been enlarged to the same size and dimension as source image 313.

The zoom level may be proportional to the ratio of the size of the original size zoom region 317a to the enlarged zoom region 317b. The zoom level may be expressed as a multiplier value such as 2× or 3× zoom. Alternatively, the zoom level may be expressed as a focal length distance. Using focal length to describe zoom level may be common in photography where a shorter focal length corresponds to a low zoom level, and a longer focal length corresponds to a higher zoom level. In embodiments where the image comprises a three-dimensional rendered scene, the zoom level may correspond to a virtual distance in the three-dimensional rendered scene between a virtual camera and a virtual object in the three-dimensional rendered scene.

Zoom level may be controlled by a user viewing image content, by multimedia equipment at the consumption endpoint, and/or by a content distributor, according to some implementations. For example, a user and/or viewer may control zoom levels to increase detail on a subsection of an image during playback. Multimedia equipment at the consumption endpoint may include equipment such as a television display, a media playback unit, a media broadcast receiving unit, or the like. For example, multimedia equipment may operate at a level of zoom to adapt image content intended for one aspect ratio to another aspect ratio. Similarly, a media broadcaster may zoom content prior to broadcast for similar reasons.

Returning to FIG. 3A, at step 303 a determination may be made whether it is necessary to enhance the zoom region 317 of source image 313. Zoom enhancement may be necessary when a zoom level would produce unacceptable image quality. Unacceptable image quality may be judged relative to the subjective experience of a viewer. For example, one subjective description of unacceptable image quality is "pixilation," which describes the phenomenon where individual source image pixels become visible to a viewer, decreasing the realism of the perceived image. When striving for realistic image reproduction, pixilation may be undesirable.

Quality Assessment

Various measures of image quality may be assessed to establish when zoom enhancement is necessary. Any characteristic of the zoom region may be evaluated to determine to enhance the zoom of the zoom region. One such measure of image quality may be based on the spatial frequency content of the zoomed region. The spatial frequency of an image refers to the two-dimensional distribution of image intensity or brightness over distance. Spatial frequency content of an image may be determined by two-dimensional Fourier decomposition. The result of Fourier decomposition of a two-dimensional signal such as an image is a weighted sum of two-dimensional basis functions corresponding to discrete frequencies. As such, the total spatial frequency content of an image may be characterized by evaluating the weights and frequencies of the constituent basis functions of an image. In images, high-frequency content may be associated with high subjective detail. An image region with substantial high-frequency content may produce pixilation at a lower level of zoom than an image region with mostly low-frequency content. For example, in an image region comprising a solid color blue sky with no fine details, i.e., primarily low-frequency content, a high zoom level may not necessarily result in loss of detail and thus may not require zoom enhancement. Conversely, an image region comprising of, for example, a chain-link fence may contain more high-frequency content corresponding to the repeating fence links against a background. This image region may deteriorate quickly as zoom levels increase because of the detail of the chain-link fence. The image region of a blue sky may be zoomed in farther than that of the chain-link fence before becoming subjectively pixelated.

The spatial frequency content of the zoomed region may be analyzed to determine if zoom enhancement is necessary. The frequency content of a zoom region may be determined by analyzing a frequency transform of the region. For example, the Discrete Cosine Transform (DCT) frequency transform may be used. In the DCT, an image region is described as a sum of a plurality of weighted basis functions, each representing a different visual frequency in the image region. Each basis function represents a two dimensional cosine wave in the image region. By evaluating the relative weights of the DCT basis functions, the frequency content of an image region may be characterized. For example, the weights of the DCT basis functions may be visualized as a histogram and divided into three portions. If the lowest-frequency portion has the highest cumulative weighting, the image region may be primarily low-frequency. Similarly, if the highest-frequency portion has the highest cumulative weighting, the image region may be primarily high-frequency. And if the middle portion has the greatest cumulative weighting, the image region may be primarily medium-frequency content.

Another measure of image quality may rely on a priori knowledge of the source image. For example, a threshold zoom level or zoom ratio may be set between acceptable zoom and unacceptable zoom levels based on knowledge of the content. This predetermined zoom threshold may be stored and applied uniformly to all display content, and/or stored in metadata associated with a piece of content. The a priori or pre-set zoom levels may be stored in metadata or set by a user preference, for example. Zoom levels beyond the threshold may be determined to require zoom enhancement, and zoom levels below the threshold may be determined to not require zoom enhancement.

Yet another measure of image quality may be the number or percentage of source pixels in the zoom region. For example, a set number of pixels may be established so that any zoom region with fewer pixels than the threshold level may be determined to require zoom enhancement. The threshold may depend on the display device and other factors such as the compression applied to the image. The threshold may be expressed as an absolute value, for example 1 megapixel (1 million pixels) or a percentage, such as 50% of the total pixels of the source image.

Texture Characterization and Database Search

Regardless of the methodology, step 303 may determine if enhanced zoom is necessary. If it is, the method may proceed to step 305. If not, the method may stop, as no further processing may be necessary. At step 305, the zoom region may be analyzed to characterize the image or texture information in the zoom region. Then, based on this characterization, one or more substitute textures stored in the texture database 319 may be chosen at step 307. And finally, at step 309 the substitute texture may be integrated into the zoom region, producing an enhanced zoom image.

At step 305, any suitable image or texture characterization method may be used to characterize the zoom region. For example, one such approach is the local binary pattern (LBP) algorithm and family of related techniques. In brief, the LBP approach describes an image or a subsection of an image by comparing pixels to neighboring pixels. For example, a pixel may be compared to its eight neighboring pixels along a circle, either clockwise or counter-clockwise. For each pixel comparison, the center pixel may be compared to the neighboring pixel and a binary decision is made. In an example, if the center pixel brightness is greater (i.e., lighter) than the brightness of a compared neighboring pixel, a value of 1 is determined, and if the center pixel is less bright than the brightness of a compared neighboring pixel, a value of 0 is determined. The comparisons may be concatenated into a single 8-bit value for each pixel. This 8-bit representation may describe the pattern of neighboring pixels for each pixel. This example assumes a monochrome image, but similar techniques may be applied to images of any color depth.

Step 305 may use metadata and other a priori information about the source image to classify or characterize the image data or textures in the zoom region. For example, in a three-dimensional scene, an object may be texture mapped with a particular texture with some metadata associated with it. In an example, a brick wall in a three-dimensional scene may be texture-mapped with a brick texture. The texture may be stored with metadata describing that it is a brick texture. This metadata and other such metadata may be used to characterize or classify the textures in the zoom region in step 305.

Another method of characterizing the image data in the zoom region may include using machine learning or computer vision techniques to identify objects or qualities of the image in the zoom region. For example, image classifiers may generate descriptive text for image regions identifying objects contained in the image. The output of these machine learning or computer vision techniques may be textual metadata or some other image description.

At step 307, a texture database 319 may be searched for a suitable substitute texture based on the characterization produced in step 305. The texture search may be based on, for example, the LBP analysis as described above. Similarly, if the texture database contains metadata about the textures stored in it, the metadata of the zoom region texture may be used to search the texture database 319 as well. Statistical methods may be used to establish a ranking or hierarchy of matches in the texture database, with the match having the greatest ranking being selected. Regardless of methodology used, step 307 may produce an identification of a texture in the texture database that corresponds to the image data in the zoom region.

Zoom Enhancement

Once a substitute texture from texture database 319 is identified in step 307, according to some embodiments, the substitute texture may be used to enhance the zoom region in step 309. One method of enhancing a zoomed region with a substitute texture may be to replace the zoomed region entirely. For example, in the chain-link fence example above, a substitute texture of a chain-link fence may be substituted for at least a portion of the original image at a high level of zoom. Any characteristic of the substitute texture may be altered to better match a characteristic of the source image before substitution. For example, the color or chrominance of the texture from the texture database may be altered to match the source image region being replaced. The replacement texture may be scaled, rotated, skewed, or otherwise dimensionally transformed to match one or more dimensions of the zoom region better. Other such parameters of the substitute texture may be modified or altered to match the source image region such as brightness, luminance, opacity, hue, saturation, tint, shade, or other image parameters.

The substitute texture may be merged with the original zoom region image to produce a blended effect. The substitute texture may be overlaid the original zoom region and an opacity applied to produce a blended or merged image. In some embodiments, only a portion of the image information of the substitute texture may be used. For example, the chrominance information of the substitute texture may be overlaid on the enlarged zoom region image to produce a blended image. In this way, the substitute texture may partially replace a portion of image information while retaining other portions of image information. Examples of the portions of image information that may be substituted independently of others include but are not limited to luminance, chrominance, brightness, opacity, hue, saturation, tine, share, or other image parameters. The result may be a zoomed region that incorporates at least some image information from the texture database 319 to enhance the zoom region 317, producing a more visually pleasing image.

Progressive Substitution

Figure 4A:
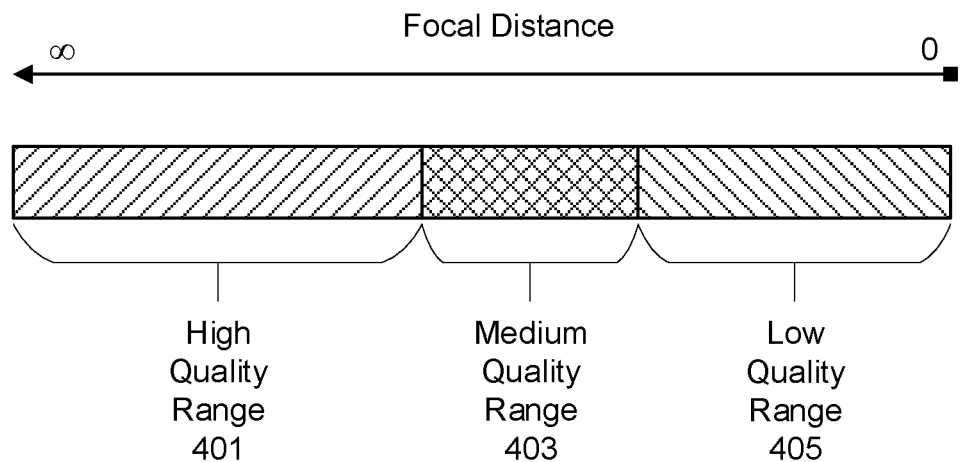
FIGS. 4A and 4B illustrate an incremental approach to using substitute textures to enhance a zoomed image.
Figure 4B:
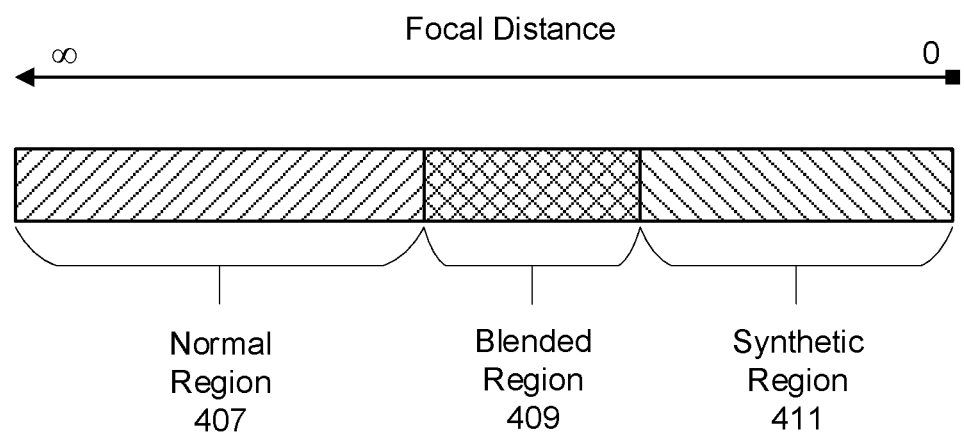

The various techniques for integrating a substitute texture with a source image may be used at various levels of zoom to produce a smooth zoom transition from low zoom level to high zoom level. FIGS. 4A and 4B illustrate an incremental approach to using substitute textures to enhance a zoomed image, according to some embodiments. FIG. 4A illustrates a relationship between zoom level and subjective quality in a zoomed image. As an operator or viewer zooms into an image or scene, the perceived level of detail may decrease. For example, zooming in from a low level of zoom to a higher level of zoom on a raster two dimensional image may enlarge a subset of an image to the size of the original image, using less of the original raster image to fill the same display area. Zooming in on a three-dimensional scene with raster textures on three-dimensional objects may have a similar effect. The greater the zoom level, the fewer original pixels that may be available to fill the same display area as before.

As the viewer zooms in further and further, the perceived image quality may decrease. Three ranges of zoom may be distinguished, according to some implementations. The first is the high quality zoom range 401. In this zoom range, the original image may contain sufficient detail to display a zoomed image with sufficient detail and may not require further processing. For reference, this region may correspond to the 'No' branch from decision step 303 in FIG. 3A.

The third zoom range 405 describes a range of zoom level that produces very poor quality zoomed images. Zoom regions at these levels may be replaced entirely by textures from a texture database because the original image contains insufficient detail to produce a zoomed image at these zoom levels.

Zoom range 403 includes zoom levels that are in between the first and third. Here, zoomed images may be of an intermediate quality and substitute textures may be merged, meshed, and/or overlaid over the original image to produce a blended image, as described above.

FIG. 4B illustrates three approaches to enhancing a zoomed image corresponding to the three zoom ranges illustrated in FIG. 4A. As the zoom level increases from left to right, the enhanced zoom region image becomes increasingly synthetic. That is, the substitute texture is used rather than the image data from the original source image, in the illustrated example. High quality range 401 corresponds to normal region 407, medium quality range 403 corresponds to blended region 409, and low quality range 405 corresponds to synthetic region 411.

Segmentation

Figure 5:
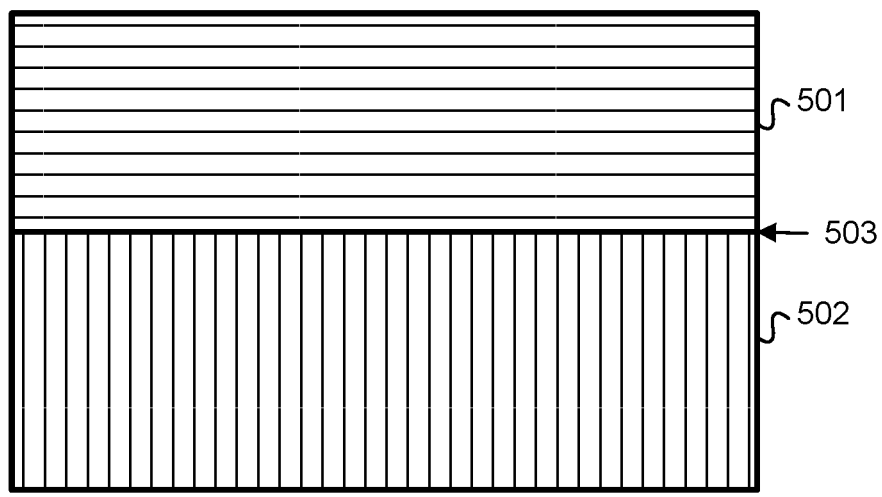
FIG. 5 illustrates an example image comprising two regions.

A substitute texture may replace the entire zoom region or a sub-region of the zoom region. FIG. 5 illustrates a zoomed image comprising two regions, 501 and 502. The division between region 501 and 502 is illustrated by line 503. For example, if the top portion of a zoom region corresponds to a cloudy sky and the bottom portion of the image corresponds to water, different textures may be applied to each portion when zooming in on the horizon between the two portions of the image.

Figure 6:
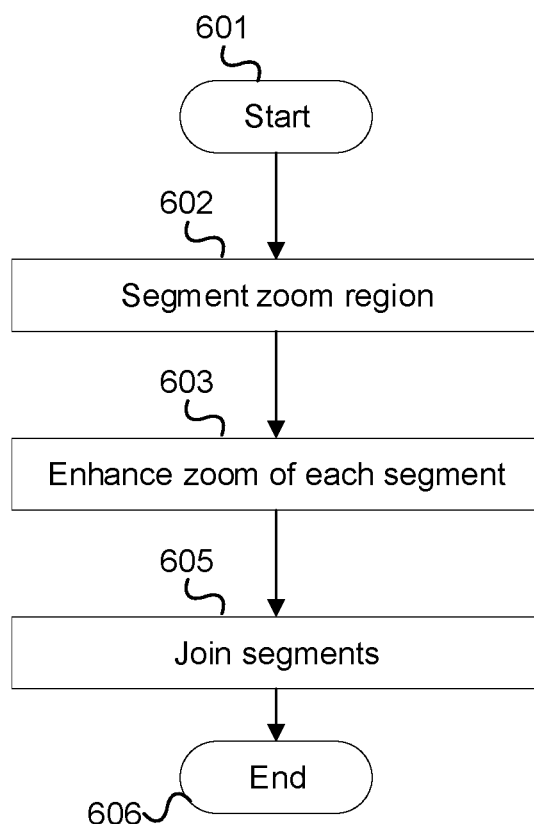
FIG. 6 illustrates an example flow diagram of a method to generate additional level of detail when zooming in on an image comprising multiple segments.

FIG. 6 illustrates an exemplary method for processing a segmented image. First, at step 602, the image may be segmented into contiguous texture regions. Then, each region may be enhanced independently of one another at step 603 according to the method illustrated in FIG. 3A. Then, at step 605, the enhanced segmented regions may be rejoined to produce a complete zoomed image.

Any number of zoom region segments may be formed in a zoom region, and the zoom region segments may be of any suitable size and/or shape. Any technique for segmenting the zoom region may be used at step 602. Examples of segmentation algorithms include but are not limited to clustering methods such as K-means algorithms, edge detection algorithms, histogram-based methods, region-growing methods, or other such segmentation techniques, algorithms, or methods. Segmentation may produce any number of segments to individually process, and segments need not be continuous shapes.

In embodiments where textures are mapped to three-dimensional objects, different textures may be mapped to different objects in a zoom region. In these embodiments, segmentation of the zoom region may follow the boundaries between objects described by the three-dimensional models of those virtual objects in the three-dimensional scene.

Once zoom enhancement for each segment is completed, the segments may be rejoined at step 605. Segments may be rejoined together by fading, blurring, blending, dithering, stitching, and/or otherwise merging the image segments back to a single zoom region image. In relation to FIG. 5, for example, rejoining enhanced zoom segments may be done by blending segments 501 and 502 along line 503.

Rendered Images

In three-dimensional rendered images, the zoom enhancement method may be applied to individual object textures. In this way, the decision of whether or not zoom enhancement is necessary described in connection with step 303 of FIG. 3A may be made relative to individual objects within the three-dimensional scene. For example, in a three-dimensional rendered scene there may be a foreground object set against a background object. Each object may have a surface texture applied to it. The distance from the virtual camera to each texture-mapped object may be used to determine if each object requires zoom enhancement. Here, the texture on the foreground object may not require zoom enhancement while the texture on the background object does.

Figure 7A:
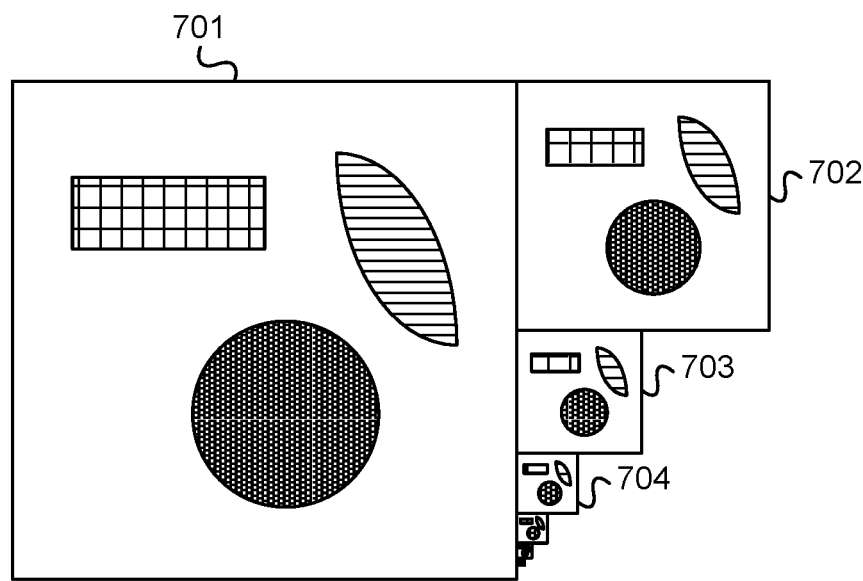
FIGS. 7A and 7B illustrate a mipmap data structure.

Therefore, the zoom enhancement may be integrated into a three-dimensional rendering pipeline. Textures may be stored for three-dimensional rendering in a mipmap. A mipmap is a data structure which stores an original size image with a sequence of progressively reduced size versions of the same image. A mipmap data structure for a texture is illustrated in FIG. 7A. Texture image 701 is a texture at a first resolution, for example 512×512 pixels. Texture image 702 is a scaled version of texture image 701, in this example scaled to half of the dimensions of 701, or 256×256 pixels for example. Similarly, texture image 703 is a half-scaled version of 702 at 128×128 pixels, and texture image 704 is a half-scaled version of texture image 703 at 64×64 pixels, etc. In this way, a mipmap may store successively smaller scaled versions of a texture in one data structure. At render time, a three-dimensional rendering engine may retrieve the appropriately scaled texture directly from this data structure without having to re-scale textures on the fly.

Figure 7B:
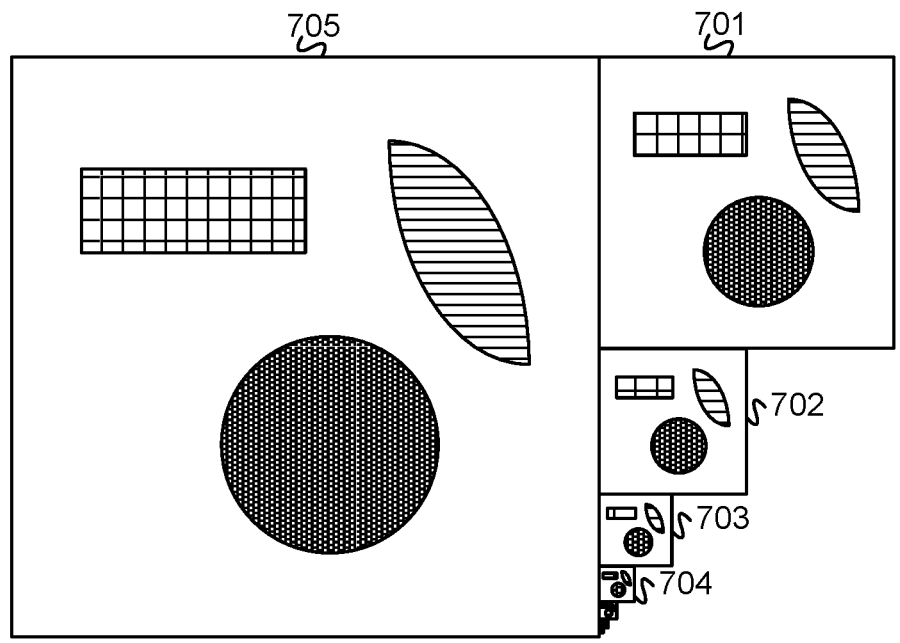

If the texture is enhanced according to the methods described above, the newly created synthetic or partially synthetic texture may be stored in the same mipmap data structure for future use. A three-dimensional rendering engine may then be able to use the higher-resolution enhance texture in the future without having to re-compute the enhanced zoom image. For example, FIG. 7B illustrates an updated mipmap with a new texture image 705. New texture image 705 may be the product of the zoom enhancement method described above and is, in this example, computed and stored at a resolution twice the size of the previously stored texture image at 1024×1024 pixels. The next time the three-dimensional rendering engine requires a higher-resolution version of texture image 701, it may be stored in the mipmap data structure as texture image 705 and ready for immediate use.

Alternatively, if integration with the rendering engine is not possible, the rendered two-dimensional raster image may be processed according to the methods above after the three-dimensional rendering process.

The Texture Database

The texture database 319 as discussed in connection with FIG. 3A contains a library of high-resolution textures that may be used to enhance zoom images according to the method illustrated in FIG. 3A. In some examples, the texture database 319 is implemented on one of servers 105-07 located in local office 103. In some examples, the texture database 319 is implemented on one of devices 110-117 located in premise 102. Texture database 319 may comprise multiple databases or data sources located in local office 103, premise 102, or otherwise accessible on communication network 100 or via external networks 109. These textures in this database may be derived from a variety of sources. The database may be universal and used for all display materials, or tailored to the display material of the source image. For example, a particular piece of content such as a movie or a television show may have its own texture database. The texture database may be associated with a genre, series, episode, movie, or any other type descriptor of visual content. In an example, the texture database may be provided by an external source, whether it be from the content creator or a generic texture database associated with a display device.

In an example, the texture database may be generated from the source image or source material itself. For example, similar textures may be identified in various scenes or frames of a piece of video content. Then, higher resolution samples of similar texture may be stored in a texture database for use with that same piece of content. For example, using the chain-link fence example, a first scene may be captured with the chain-link fence in the far background, at a long focal distance. A second scene may include a closer view of the same or a similar chain-link fence at a closer focal distance, so a higher resolution sample of the chain-link fence texture may be present in the same source material. This higher resolution texture sample may be extracted from the source material and used to enhance or replace the lower resolution texture in a zoom region in another scene of the same source material.

Figure 8:
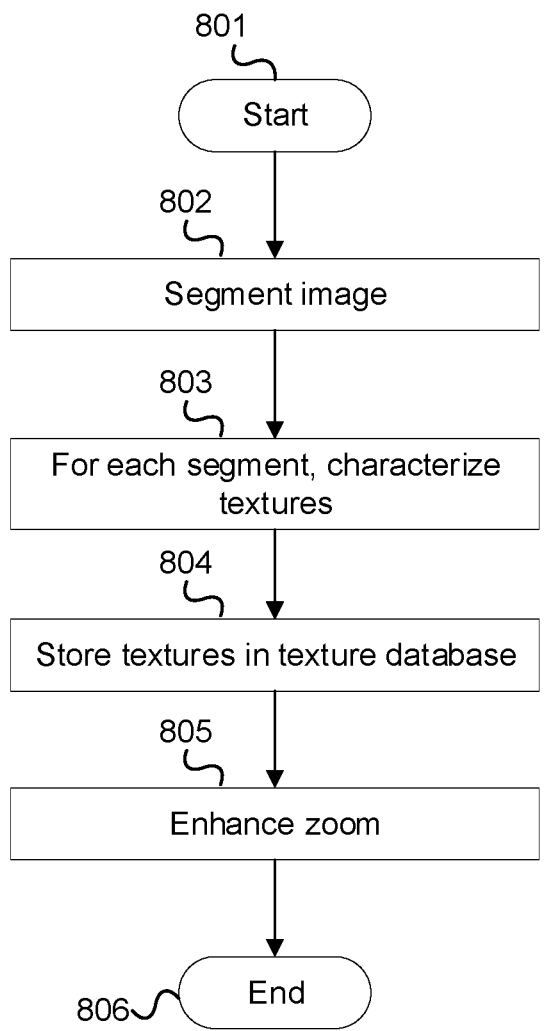
FIG. 8 illustrates an example flow diagram of a method to generate additional level of detail when zooming in on an image comprising multiple segments.

FIG. 8 illustrates an example of this process. At step 802, a source image may be segmented according to the segmentation processes described above. At step 803, each of the segments may be characterized using the same characterization process as described above. Each of these textures along with their characterization information may then be stored in a texture database at step 804. Optionally, textures may be stored only if they are significantly different than any already stored in the texture database, as determined by the same characterization and searching algorithm as discussed in connection with FIG. 3A. Then, at step 805, the zoom enhancement process described above may be performed using the texture database from step 804. In this way, the zoom enhancement of a source image may use textures derived from that same source image.

Figure 9:
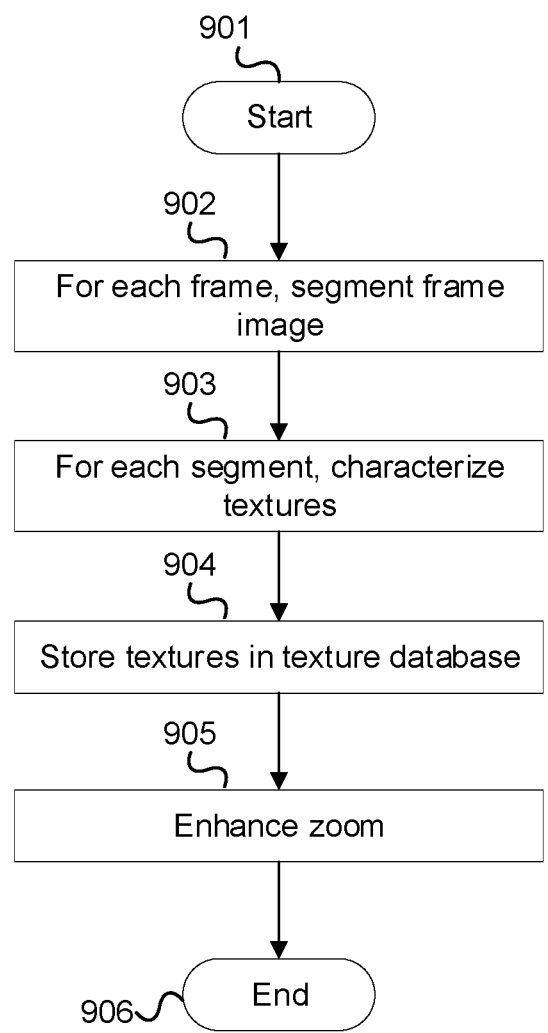
FIG. 9 illustrates an example flow diagram of a method to generate additional level of detail when zooming in on an image comprising multiple frames and multiple segments.

The exemplary process illustrated in FIG. 8 may also be applied to a video image, such as a movie. The exemplary process illustrated in FIG. 9 is the same as described above in connection with FIG. 8, but performed on each frame of the video image, illustrated in step 902. Steps 903-905 are then analogous to steps 802-805 discussed above. The resultant texture database would include texture samples from every frame of the movie source image.

Vector Textures

The zoom enhancement examples above generally discussed in of raster based images. Substitute textures may also be vector-based. Raster graphics describe images by describing a plurality of pixels, individual points of image data, which represent an image or scene. Vector graphics describe an image by mathematical models describing lines, colors, gradients, and other such parameters which comprise the image. Vector graphics, because they are mathematical models, may be zoomed or scaled without loss of quality. Conversely, raster graphics are limited in how far they may be zoomed by the pixel information in the image.

Vector textures may be stored in texture database 319. The texture database 319 may be compiled a priori or from the source material as described above regarding raster textures. Similarly, texture database 319 may be general or generic, or tailored to a particular source material. Texture database 319 may comprise all raster textures, all vector textures, or a combination of raster and texture vectors.

Vector textures stored in texture database 319 may be rasterized at various resolutions for use as raster textures in conjunction with raster images. Rasterization is the process of deriving a raster image from a vector image. For source material or processes incompatible with native vector textures, vector textures may be pre-rasterized or rasterized on-demand to produce raster textures of an appropriate resolution and size for a given use.

Vector textures may be derived from the source image. This process may be referred to as vectorization, raster-to-vector conversion, or image tracing, for example. Using vectorization, a region of a raster source image may be converted to a vector representation to produce a vector texture. The resultant vector texture may then be used in one of the above methods to enhance a zoom of the region. Any appropriate vectorization algorithm may be used to convert a raster image region to a vector representation. Vectorization may take place in a pre-processing step or on-demand as needed.

EXAMPLES

In some embodiments, substitute or reference textures may be selected to correlate with the source image, producing a faithful representation of the source image. In other embodiments, substitute textures are selected for reasons other than producing a faithful representation of the source image. For example, replacement textures may be chosen for artistic purposes. Content producers may select seemingly unrelated zoom replacement textures that add a new and unique artistic element to a piece of content.

For example, replacement textures may be selected for artistic purposes such as providing hidden information on closer zoom levels that is not a part of the source image. For example, relevant information to a storyline of a movie may be hidden in close-zoomed textures that are not visible at a default zoom level, providing an additional level of interactivity to the content.

Textures may be selected for marketing or advertising purposes. For example, an advertisement may be inserted at certain levels of zoom. Advertisement textures may be available only at certain levels of zoom. An advertisement texture may be selected to blend in with the surrounding source image or selected to stand out in contrast to the surrounding source image. Advertisement textures may be targeted to certain viewers based on the source image or other personal data available in communication network 100 or otherwise available.

Figure 10:
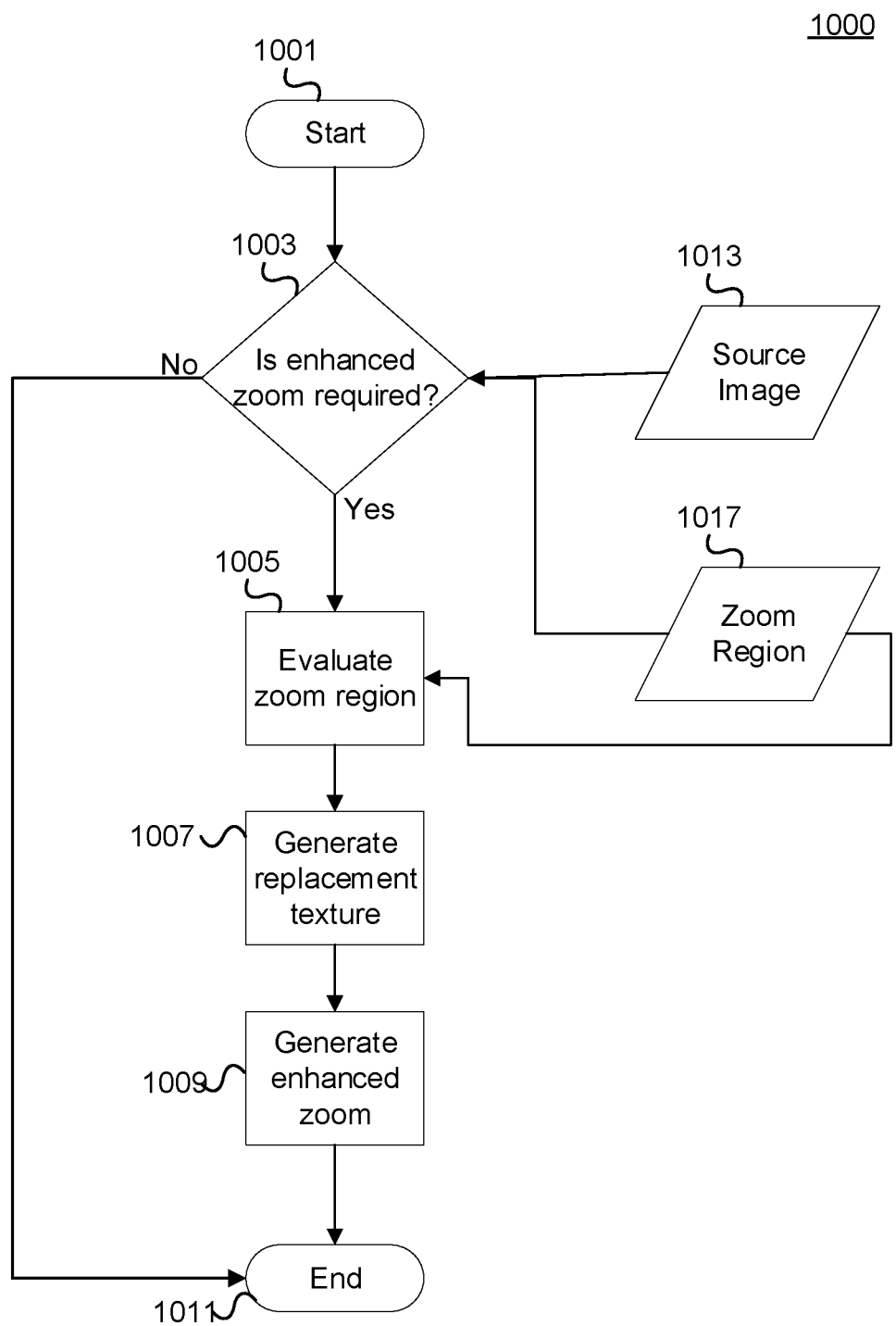
FIG. 10 is an example flow diagram of a method to generate additional level of detail when zooming in on an image using generated replacement textures.

In an example, a texture may be dynamically or programmatically generated rather than retrieved from a database. FIG. 10 illustrates an exemplary method to generate additional levels of details when zooming that does not rely on a texture database. The method illustrated in FIG. 10 is analogous to that illustrated in FIG. 3A, but does not include a texture database 319. Rather, at step 1007, instead of searching a texture database such as illustrated by step 307, the method illustrated in FIG. 10 generates a replacement texture. The remaining steps illustrates in FIG. 10 correspond to the similar steps illustrated in FIG. 3A.

Generated textures may be used for a number of effects, both artistic and otherwise. For example, a texture may be generated to give an illusion of infinite zoom levels. As a viewer zooms in further and further to a texture, additional levels of zoom texture are programmatically generated. This effect may be used to represent zoom levels on a microscopic, atomic, or even sub-atomic level to add an artistic or scientific element to source material.

In an artistic example, zoom behavior may change dynamically from one zoom direction to another using generated textures. For example, zooming in on an object may operate as expected and reveal a closer level of zoom of that object, but when the user zooms out the surrounding scene may be substituted with another scene, effectively transporting the viewer from one scene to the next via zoom interaction. Another example of artistic dynamic zoom is a zoom hysteresis example where zooming in one direction may reveal a different effect or texture than zooming in the opposite direction.

In an example, the zoom region defines the total area of source image. That is, the zoom enhancement method may enlarge an entire source image to a higher resolution. This procedure may also be referred to as image scaling, image resizing, upsampling, and/or upscaling. In an example, a video image containing 1920×1080 image data may be up-scaled to a higher resolution such as 3840×2160 using the zoom enhancement methods disclosed herein. An application may be to adapt content originally generated at a lower resolution for display on a high-resolution display.

Although examples are described above, the various features and steps may be combined, divided, omitted, rearranged, revised or augmented in any desired manner, depending on the specific outcome or application. Various alterations, modifications, and improvements will readily occur to those skilled in art. Such alterations, modifications, and improvements as are made obvious by this disclosure are intended to be part of this description, though not expressly stated herein, and are intended to be within the spirit and scope of the disclosure. Accordingly, the foregoing description is by way of example only, and not limiting. This patent is limited only as defined in the following claims and equivalents thereto.

What is claimed is:

1. A method comprising:
    receiving, by a computing device, an input indicative of a zoom region for an image;
    determining a first characteristic of first image data associated with the zoom region in the image;
    determining, based on the first characteristic, to generate enhanced second image data corresponding to the first image data; and
    based on determining to generate enhanced second image data corresponding to the first image data:
        determining, based on an association with the first characteristic, a second characteristic of the first image data;
        searching a texture database for textures corresponding to the second characteristic;
        selecting a first texture based on the searching; and
        combining the first texture and the first image data to produce the enhanced second image data.

2. The method of claim 1, wherein the first characteristic of the first image data is a virtual distance in a three-dimensional scene that is measured from a virtual camera to a virtual object.

3. The method of claim 1, wherein the first characteristic is a measure of detail of the first image data.

4. The method of claim 1, wherein the first characteristic is a zoom ratio that is based on a dimension of the zoom region and that is based on a dimension of the image, and wherein the determining to generate enhanced second image data corresponding to the first image data comprises determining that the zoom ratio is greater than a predetermined threshold.

5. The method of claim 1, wherein the first texture is a texture comprising vector data.

6. The method of claim 1, wherein the combining the first texture and the first image data comprises replacing at least a portion of the first image data with the first texture.

7. The method of claim 1, wherein the combining the first texture and the first image data comprises:

adjusting an opacity of the first texture; and
overlaying the first texture over the first image data.

8. The method of claim 1, wherein the combining the first texture and the first image data comprises:
   determining a third characteristic of the first image data; and
   adjusting a characteristic of the first texture to correspond to the third characteristic of the first image data.

9. The method of claim 1, wherein the second characteristic of the first image data is a local binary pattern.

10. The method of claim 1, wherein the image is a frame of a video sequence.

11. A method comprising:
   receiving, by a computing device, an input indicative of a zoom region for an image, wherein the zoom region is associated with first image data of the image;
   segmenting at least a portion of the first image data into a plurality of segments;
   generating enhanced image data corresponding to the first image data by, for each respective segment of the plurality of segments:
      determining a first characteristic of the respective segment;
      searching a texture database for textures corresponding to the first characteristic;
      selecting a texture based on the searching; and
      combining the texture and the respective segment to produce an enhanced segment corresponding to the respective segment.

12. The method of claim 11, wherein image data content corresponding to the plurality of segments comprises all of the first image data.

13. The method of claim 11, wherein the generating enhanced image data corresponding to the first image data further comprises, for each respective segment of the plurality of segments:
   combining the enhanced segment corresponding to the respective segment with the first image data.

14. The method of claim 11, wherein the image is a frame of a video sequence.

15. The method of claim 11, wherein the texture database contains textures derived from the image.

16. A method comprising:
   determining, by a computing device, a first characteristic of a first texture mapped to a virtual object in a three-dimensional scene;
   determining, based on the first characteristic, to enhance the virtual object;
   based on determining to enhance the virtual object:
      determining a second characteristic of the first texture;
      selecting, from a texture database, a second texture corresponding to the second characteristic;
      generating a third texture that is based on the first texture and based on the second texture; and
      mapping the third texture to the virtual object.

17. The method of claim 16, wherein the first characteristic is a virtual distance in the three-dimensional scene that is measured from a virtual camera to the virtual object.

18. The method of claim 16, wherein the first characteristic is determined from metadata associated with the first texture.

19. The method of claim 16, wherein the selecting, from a texture database, a second texture corresponding to the second characteristic comprises:
   determining that the texture database does not contain a second texture corresponding to the second characteristic;
   generating a generated texture corresponding to the second characteristic; and
   adding the generated texture to the texture database.

20. The method of claim 19, wherein the generating the generated texture corresponding to the second characteristic comprises:
   generating a vector representation of the first texture;
   scaling the vector representation of the first texture to produce a scaled vector representation of the first texture; and
   generating the generated texture based on the scaled vector representation of the first texture.

* * * * *